United States Patent [19]

Floyd

[11] 4,180,487

[45] Dec. 25, 1979

[54] EPOXY CURABLE RESIN COMPOSITION

[75] Inventor: Don E. Floyd, Minneapolis, Minn.

[73] Assignee: Henkel Corporation, Minneapolis, Minn.

[21] Appl. No.: 902,581

[22] Filed: May 4, 1978

[51] Int. Cl.[2] .................... C08G 59/50; C08G 73/02

[52] U.S. Cl. .................... 260/18 N; 260/18 EP; 260/18 PN

[58] Field of Search ............ 260/18 EP, 18 N, 18 PN

[56] References Cited

U.S. PATENT DOCUMENTS

| | | | |
|---|---|---|---|
| 2,548,447 | 4/1951 | Shokal et al. | 260/32.4 |
| 2,638,450 | 5/1953 | White et al. | 260/583 P |
| 2,939,859 | 6/1960 | Rumscheidt et al. | 260/17.45 G |
| 2,984,687 | 5/1961 | Esmay et al. | 260/563 R |
| 2,999,825 | 9/1961 | Floyd et al. | 260/18 PN |
| 3,127,365 | 3/1964 | Floyd | 260/23 CP |
| 3,280,074 | 10/1966 | McCaleb et al. | 260/37 EP |
| 3,364,248 | 1/1968 | Miller et al. | 260/583 P |
| 3,383,434 | 5/1968 | Carlston et al. | 260/835 |
| 3,551,235 | 12/1970 | Bassemir et al. | 260/23 AR |
| 3,551,246 | 12/1970 | Bassemir et al. | 260/836 |
| 3,551,311 | 12/1970 | Nass et al. | 260/836 |
| 3,558,387 | 1/1971 | Bassemir et al. | 260/23 P |
| 3,637,618 | 1/1972 | May | 260/830 TW |
| 3,666,695 | 5/1972 | Jachimowicz et al. | 260/18 PN |
| 3,692,714 | 9/1972 | Keyman et al. | 260/18 PN |
| 3,694,409 | 9/1972 | Miller et al. | 260/18 EP |
| 3,816,366 | 6/1974 | Laudise | 260/23 EP |
| 3,876,518 | 4/1975 | Borden et al. | 260/23 EP |
| 3,925,349 | 12/1975 | Gaske | 260/836 R |
| 3,931,075 | 1/1976 | Trecker et al. | 260/23 EP |
| 3,962,337 | 6/1976 | Drake | 252/472 |
| 3,989,610 | 11/1976 | Katsushige et al. | 260/831 |
| 4,044,053 | 8/1977 | Brennan et al. | 260/583 P |
| 4,051,195 | 9/1977 | McWhorter | 260/837 R |

FOREIGN PATENT DOCUMENTS 711654 7/1954 United Kingdom .

*Primary Examiner*—Ronald W. Griffin
*Attorney, Agent, or Firm*—Patrick J. Span; Elizabeth Tweedy; Forrest L. Collins

[57] ABSTRACT

The present invention describes epoxy curable polyamine resin compositions.

18 Claims, No Drawings

EPOXY CURABLE RESIN COMPOSITION

BACKGROUND OF THE INVENTION

1. Field of the Invention

The present invention relates to curable compositions which may be used for coatings, paints and the like.

2. Description of the Art

Numerous coating compositions are, of course, known in the art. While some coating compositions appear useful over a broad range of conditions there will always be one or two points at which a given coating composition is no longer suitable for its intended purpose.

Exemplary of coating compositions in the polyamide and epoxy area include: U.S. Pat. No. 2,548,447 issued to Shokal et al. on Apr. 10, 1951. The Shokal et al. patent describes fluid compositions comprising glycidyl polyethers and cyano-substituted hydrocarbons. The U.S. Pat. No. 2,939,859 issued to Rumscheidt on June 7, 1960 describes a process for preparing resinified products of high quality for mixtures of polyepoxy polyethers and aromatic-substituted-1-alkenes.

Floyd et al. in U.S. Pat. No. 2,999,825 issued Sept. 12, 1961, relates to reaction products of amino polyamide-ester blends with epoxy resins. Floyd, again, in U.S. Pat. No. 3,127,365 issued Mar. 31, 1964 describes amino-polyamides which have been modified by the reaction with acrylic compounds.

U.S. Pat. No. 3,383,434 issued May 14, 1968 to Carlston discusses copolymerized resins prepared by reacting a diepoxide of a particular equivalent weight, an unsaturated polyester and an epoxy resin curing polyamine.

Bassemir in U.S. Pat. No. 3,551,235 issued Dec. 29, 1970 describes ethylenically unsaturated materials as being useful in forming resin coatings. Bassemir in U.S. Pat. No. 3,551,246 issued Dec. 29, 1970 discloses photopolymerizable compositions containing ethylenically unsaturated esters. U.S. Pat. No. 3,551,311 issued to Nass et al. on Dec. 29, 1970 also describes ethylenically unsaturated esters as being useful in coating compositions. Bassemir et al. in U.S. Pat. No. 3,558,387 issued Jan. 26, 1971 describes photopolymerizable compositions containing at least one ester of an ethylenically unsaturated acid and a dihydric or trihydric alcohol together with particular photoinitiators.

U.S. Pat. No. 3,637,618 issued Jan. 25, 1972 to May describes a mixture of a curable composition which is an unsaturated polyester of a normally liquid polyepoxide and an ethylenically unsaturated organic carboxylic acid plus a dissimilar normally solid polymeric material having a plurality of epoxy groups.

Laudise in U.S. Pat. No. 3,816,366 issued June 11, 1974 describes adducts of active acrylic compounds and an aminoamide of a monomeric fatty compound. U.S. Pat. No. 3,876,518 issued to Borden et al., on Apr. 8, 1975 describes the production of amine derivatives of acrylated epoxidized soybean oil. A later patent to Trecker et al. describing the same subject matter issued Jan. 6, 1976 as U.S. Pat. No. 3,931,075.

Gaske in U.S. Pat. No. 3,925,349 issued Dec. 9, 1975 discusses the production of radiation curable non-gelled Michael addition reaction products containing unreacted acrylate groups. Further discussions of amino compounds containing terminal ethylene groups is found in Tsukada U.S. Pat. No. 3,989,610 issued Nov. 2, 1976.

Monotertiary monosecondary diprimary tetramines which are useful in the present invention are described in U.S. Patent application Ser. No. 784,381 filed Apr. 4, 1977.

A general discussion on the properties of amines is found in Lee et al., "Handbook of Epoxy resins", McGraw-Hill Book Company, New York, 1967, pp. 7-1 to 7-15.

It has been determined that the epoxy curable resins described in this invention provide advantageous properties over the foregoing art.

Where percentages and ratios are used in the specification and claims they are by weight unless otherwise indicated. Similarly, temperatures are given in degrees Celsius unless noted otherwise.

SUMMARY OF THE INVENTION

The present invention provides for an epoxy curable resin composition comprising an adduct of:

(a) at least about three equivalents of a polyamine substantially free of polyamide groups containing at least two primary amine groups, and one secondary or tertiary amine group said polyamine resin having a fatty tail, and;

(b) one equivalent per three equivalents of component (a) of a polyfunctional acrylic compound which is an ester of a member selected from the group consisting of acrylic acid and methacrylic acid and mixtures thereof and at least an equivalent amount of a polyol.

DETAILED DESCRIPTION OF THE INVENTION

The present invention as previously noted relates to an adduct for curing of epoxy resins. In this invention it has been found that polyamines which are free of amido groups provide for lower viscosity and higher solids content in the adducting system. This is particularly true where the polyamine contains polyamide links in the backbone of the polyamine. That is, it is believed that the absence of amido groups in the polyamine eliminates that possibility of hydrogen bonding thus accounting for the aforementioned benefits. By reducing hydrogen bonding the need for a solvent based polyamine is reduced or eliminated. It is also noted that the polyamine adducts of the present invention also provide for high water resistance in the epoxy cured coating.

Additional advantages found in the present invention include the fact that carbonation during manufacture of the polyamine and during the cure is substantially lessened. Many resins are claimed not to carbonate during the cure but this is often due to premature carbonation while the resin is being formed which is no real advantage.

The first component of the present invention to be discussed is the polyfunctional acrylic compound used to pre-adduct the polyamine. The polyfunctional acrylic compound by definition contains two or more acrylic or methacrylic groups condensed with a polyol. That is, the polyfunctional acrylic compound is an ester of the polyol and preferably an equivalent amount of acrylic or methacrylic acid based on the hydroxyl functionality of the polyol. In some cases, free hydroxyls are left on the polyol for an additional isocyanate cure.

Any suitable polyol may be used to form the polyfunctional acrylic compound. Preferably the polyol is saturated, that is, not containing any unsaturation which is reactive like the acrylic or methacrylic functional group. Particular examples of polyols which may be used to form the polyfunctional acrylic compound include alkyl and cycloalkyl polyols such as 2,5-hexanediol, 1,6-hexanediol, Dimerol® a 36 carbon essentially linear diol available from General Mills Chemicals, Inc., glycerol, 1,2,6-hexanetriol, pentaerythritol, 1,4-cyclohexanediol, Polybd R-45HT a butadiene diol having an approximate molecular weight of about 2800 available from Arco and Trimethylol propane.

Of particular interest in forming the polyfunctional acrylic compound of the present invention are 1,6-hexanediol, trimethylol propane, and pentaerythritol and mixtures thereof.

It has also been found that desirable properties exist in the adduct when that material contains at least four carbon atoms in the polyol portion of the polyfunctional acrylic compound. This observation is related to the water resistance of the epoxy cured adduct. It has also been observed that desirable properties are obtained in the adduct when the polyfunctional acrylic compound contains as the polyol a diol, triol or tetrol.

As previously stated, the polyfunctional acrylic compound is formed from the polyols exemplified above and acrylic or methacrylic acid and mixtures thereof. The polyfunctional acrylic compound is thus simply an ester of the polyol and the particular unsaturated acid formed in any convenient manner. In order to ensure full reactivity of the substantially volatile components of the present invention, it is necessary that at least an equivalent amount of the polyol be used based on the acrylic or methacrylic acid. That is, it is undesirable to retain any free unsaturated acid in the product. One purpose in avoiding excessive amounts of the acrylic acid or methacrylic acid is so that material does not compete with the polyfunctional acrylic compound for the polyamine resin during formation of the adduct.

The polyamine used in the present invention to form the adduct is a material which is free of amido or amido forming linkages. That is, the polyamine compound should not contain either an amido linkage or a carboxyl group which would then react with the free amine functionality of the polyamine to give an amido group.

The polyamine resin is a material containing at least two primary amine groups and one secondary or tertiary amine group. The adduct has been found to perform best as an epoxy curing agent when the polyamine resin contains a fatty tail (4 or more carbon atoms) especially when the fatty tail contains from about 12 to 24, preferably from about 14 to about 20 carbon atoms. Suitable examples of polyamines which may be used in the present invention include those described in U.S. Pat. No. 3,280,074 issued Oct. 18, 1966 to McCaleb et al. Similarly, U.S. Pat. No. 3,364,248 issued to Miller et al. on Jan. 16, 1968 also shows polyamines suitable for use in the present invention. Further disclosures on the preparation of polyamines are found in U.S. Pat. No. 3,962,337 issued June 8, 1976 to Drake et al.

Additional disclosures relating to the N-alkylation of amines which may be used to form the polyamine of the present invention are found disclosed in U.S. Pat. No. 2,984,687 issued May 16, 1961 to Esmay et al.

Another example of polyamines which may be used to form the adduct of the present invention are disclosed in U.S. Pat. No. 3,694,409 issued to Miller et al, Sept. 26, 1972. The preparation of trialkylamines suitable for use in the present invention, are further disclosed in British Pat. No. 711,654 published July 7, 1954.

A particularly useful polyamine which may be used to form the adduct used to cure epoxies is disclosed in U.S. Patent application Ser. No. 784,381 filed Apr. 4, 1977 by Harrison.

The foregoing references to the extent that they are applicable to the formation of polyamines are each specifically incorporated herein by reference. Where the disclosure of the foregoing references includes amido or amido forming radicals, such disclosure should be disregarded for the reasons previously given.

With respect to the Harrison application mentioned above, the following is a disclosure of the method of preparation of the tetramines.

The present invention as previously stated includes the use of non-linear monotertiarymonosecondarydiprimarytetramine as shown below in forming the adduct.

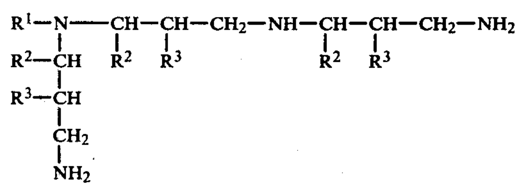

wherein $R_1$ is a fatty tail and $R_2$ and $R_3$ are selected from the group consisting of hydrogen and methyl and mixtures thereof.

The non-linear nature of the tetram arises from the fact that the tertiary nitrogen is attached to the organic moiety $R^1$ such as an alkyl, alkenyl, phenyl, alkylphenyl or phenylalkyl (where the alkyl residue in the aromatic moiety is preferably $C_1$–$C_4$) which is linear thus the primary nitrogens are in a nonlinear relationship to one another.

The first aspect to be discussed in forming the tetram is that of the preparation of the precursor dinitrilodiamine compound. The non-linear monotertiarymonosecondarydinitrilodiamine is basically prepared by reacting a primary amine having the formula:

$$R^1NH_2$$

wherein $R^1$ is an organic moiety of from 4 to 40 carbon atoms preferably an alkyl or alkenyl radical having from about 10 to about 22 carbon atoms and most preferably having an even number of carbon atoms from 12 to 18 with a nitrile of the formula shown below wherein $R^2$ is an alkyl or alkenyl radical having 1 to 40 carbon atoms, hydrogen, phenyl or alkyl (preferably $C_1$–$C_4$ alkyl) phenyl and $R^3$ is hydrogen or methyl to form the previously shown adduct. In the reaction $R^2$ is preferably hydrogen although lower alkyl or alkenyl (olefin) radicals having from 1 to 4 carbon atoms may be effectively used.

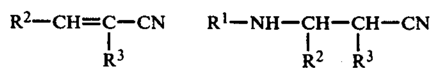

In the most preferred circumstance both $R^2$ and $R^3$ are hydrogen.

The solvent utilized throughout the processing to form the tetram is preferably a lower alkanol such as methanol, ethanol, or propanol, although ethers, such as diethyl ether or tetrahydrofuran may be employed. Most preferably, however, the solvent for cost and processing reasons is methanol. Preferably the solvent is present in a weight ratio to the total reactants in the process at a level of from about 5% to 100%. This solvent level is conveniently maintained throughout the remaining processing steps to the final formation of the tetram.

Conveniently the primary amine, the solvent and the nitrile are placed in an enclosed vessel and stirred and heated under reflux for a period from about 1 to 3 hours at which time the reaction is complete. The reaction mixture is thereafter hydrogenated preferably using a hydrogenation catalyst such as Raney nickel, Raney cobalt, or platinum to form the monosecondarymonoprimarydiamine as shown below:

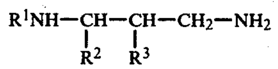

Where the nitrile is not completely consumed in the addition reaction it is desirable to flush the excess out of the vessel prior to the hydrogenation to avoid undesirable by-products.

The diamine so formed is then reacted with an additional portion of the nitrile which is added over a period of about one hour by means of a dropping funnel to the diamine. Inasmuch as the reaction is exothermic, little energy need be applied. However, the temperature of the reaction vessel should be maintained between about 30 and 90 degrees C. to ensure substantial completion of the reaction. Following complete addition of the nitrile this reaction mixture is refluxed for from about 1 to 3 hours with an optimum refluxing temperature of about 80 degrees C. It is noted that in either of the two nitrile addition reactions that the nitrile is used in the equivalent quantity needed to prepare the desired adduct. Conveniently, where yield of the desired products is flexible the equivalent ratio may be between 0.7:1 to 2:1, most preferably 0.8:1 to 1.5:1 of the acrylonitrile to the amine.

Following the addition of the second portion of the nitrile, the compound shown below is obtained. At this point the production of the non-linear monotertiarymonosecondarydinitrilodiamine is complete and the solvent and any excess nitrile may be removed by distillation.

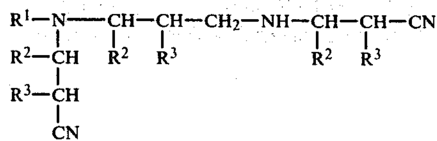

The formation of the non-linear monotertiarymonosecondarydiprimarytetramine is accomplished by hydrogenating the corresponding dinitrilodiamine. The conditions for the hydrogenation are as previously noted preferably using a hydrogenation catalyst. Again, any excess nitrile should be removed prior to hydrogenation. The pressure for the hydrogenation in absolute units should not be less than 15,000 mm Hg and should be conducted at a temperature from about 60 degrees C. to about 120 degrees C. Preferably the hydrogenation conditions are such that the pressure is at least about 18,000 mm Hg absolute and from about 80 degrees C. to about 110 degrees C. It is preferred that during the hydrogenation reaction that ammonia be added to the reaction vessel to minimize the tendency of the dinitrilodiamine to condense with itself and liberate ammonia gas. The total pressure requirements for the mixture of the compound, the hydrogen gas and the ammonia are generally required to be in the range of 18,000 mm to 24,000 mm Hg. The tetram so formed is shown below:

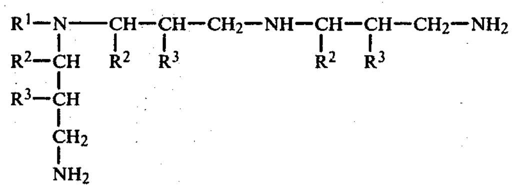

The next aspect to be discussed in the present invention is that of the formation of the adduct of the polyamine and the polyfunctional acrylic compound. The adduct formation is quite simple and requires few constraints for a high degree of reproducability. Primarily, the polyamine resin is combined such that there are at least three equivalents of active hydrogen from the polyamine resin per acrylic functional group on the polyfunctional acrylic compound. Preferentially, there are from about 3 to about 5 equivalent groups of active hydrogen from the polyamine per acrylic functional group on the polyfunctional acrylic compound.

The adduct is simply formed by combining the polyamine and the polyfunctional acrylic compound in a suitable vessel. Carbon dioxide should be excluded from the reaction vessel to avoid undue carbonation of the amine. It has been found in the present invention that by combining the components to form the adduct in the proportions previously recited that a substantial amount of the primary amine structure will be taken up, thus avoiding carbonation. In the absence of removing the primary amine structure through adduction a much greater degree of carbonation will be found in the cured epoxy coating. If desired, small amounts of alpha, beta unsaturated compounds such as acrylonitrile or acrylamide which function to take up the excess primary amine structure may be employed. These alpha, beta unsaturated compounds are believed to function in that they are highly reactive with the primary amine structure thus eliminating the most probable site of carbonation. The amount of this component is preferably that amount necessary to eliminate the primary amine structure. This amount is conveniently determined by calculation or experimentation to determine the amount of primary amine present and then utilizing this knowledge to determine the necessary equivalents of the alpha, beta unsaturated compound. The use of acrylamide is not so substantial as to cause the polyamine to have polyamide like properties. This is supported by the fact that the acrylamide is most reactive with the primary amines on the polyamine thus causing the amido groups to be terminal where any hydrogen bonding is minimal.

The primary utility of the adduct so formed in the present invention is as an epoxy curing agent. In general, the most commonly available epoxy resins are those which are the reaction products of epichlorohydrin and bis(parahydroxyphenyl) propane, "bisphenol A," such as are described in the McCaleb et al patent (3,280,074) incorporated herein by reference. Alternatively, "bisphenol F" which is bis(parahydroxyphenyl)methane may be utilized.

Other such epoxy resins are those which are the reaction product of epichlorohydrin and bis(parahydroxyphenyl) sulfone. Still another group of epoxy compounds which may be employed are the glycidyl esters of the polymeric fat acids. These glycidyl esters are obtained by reacting the polymeric fat acids with polyfunctional halohydrins such as epichlorohydrins. In addition, the glycidyl esters are also commercially available epoxide materials. The glycidyl esters of the polymeric fat acids are also useful in the present invention and are also described in the McCaleb et al patent.

The polymeric fat acids are well known materials, commercially available, which are the products from the polymerization of unsaturated fatty acids to provide a mixture of dibasic and higher polymeric fat acids. The polymeric fat acids are those resulting from the polymerization of the drying or semidrying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil and the like. The term "polymeric fat acids" as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic acid. Accordingly, it should be appreciated that polymeric fat acids will, as a practical matter, result from fatty acid mixtures that contain a preponderance of linoleic acid and will thus generally be composed largely of dimerized linoleic acid. However, polymerized fatty acids may be prepared from the naturally occurring fatty acids having from 8 to 22, and preferably 16 to 20, carbon atoms. Illustrative thereof are oleic, linolenic, palmitoleic, and the like.

Other types of epoxy resins which may be cured with the present products and which are commercially available epoxy materials are the polyglycidyl ethers of tetraphenols which have two hydroxy aryl groups at each end of an aliphatic hydrocarbon chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, omega, omega-tetrakis (hydroxyphenol) alkanes, such as 1,1,2,2-tetrakis(hydroxyphenol)ethane, 1,1,4,4-tetrakis(hydroxyphenol) butane, 1,1,4,4-tetrakis(hydroxyphenol) - 2 - ethylbutane and the like. The epoxy resin reaction product of the epichlorohydrin and tetraphenol is also shown in the McCaleb et al patent with the appropriate limitations shown therein.

Still another group of epoxide materials are the epoxidized novolac resins. Such resins are well-known substances and readily available commercially as evidenced in McCaleb et al.

In general, these resins are obtained by epoxidation of the well-known novolac resins. The novolac resins, as is known in the art, are produced by condensing the phenol with an aledhyde in the presence of an acid catalyst. Although novolac resins from formaldehyde are generally employed, novolac resins from other aldehydes such as, for example, acetaldehyde, chloral, butyraldehyde, furfural, and the like, may also be used. The alkyl groups, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be in the para position in the phenolic nucleus. However, novolac resins in which the alkyl groups are in the ortho position have been prepared.

The epoxidized novolac resin is formed in the well-known manner by adding the novolac resin to the epichlorohydrin and then adding an alkali metal hydroxide to the mixture so as to effect the desired condensation reaction.

In addition, other epoxy resins which may be cured with the curing agent of the present invention are the glycidyl ethers of the polyalkylene glycols, epoxidized olefins such as epoxidized polybutadiene and epoxidized cyclohexanes.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resin divided by the mean number of epoxy radicals per molecule, or, in any case, the number of grams of epoxy resin equivalent to one epoxy group or one gram equivalent of epoxide. The epoxy resinous materials employed in this invention have an epoxy equivalent weight of from about 140 to about 2,000, preferably from about 140 to 300.

Liquid modifiers such as triphenyl phosphite (ModEpox), a tertiary amine (DMP30), nonyl phenol, and flow control agents such as silicone resins and oils may be used to achieve quicker curing or smoother films when dried under adverse conditions. Liquid plasticizers such as dibutyl phthalate may be added. The addition of judicious amounts of triphenyl phosphite or fluid plasticizers would reduce viscosity further to facilitate handling. Small amounts of solvents may be used to secure even lower viscosity, but of course, the combination would not then be solvent free.

Solid modifiers may be used such as pigments and fillers normally used in paints, or sand which might be added to produce trowelling concrete toppings or floor coatings. Treated clays and amorphous silica may be used to secure non-sagging thick coatings for vertical surfaces.

The following are examples of the present invention:

EXAMPLE I

Adducts for curing epoxy resins are prepared in the present invention as shown below:

| | Parts by Weight | | | | |
|---|---|---|---|---|---|
| | I | II | III | IV | V |
| tallow aminodipropyl amine (a monotertiarydiprimary amine) | 57 | 57 | 100 | | |
| tetram* | | | | 100 | 100 |
| 1,6-hexanediol diacrylate | 11.3 | 11 | | 10 | |
| trimethyolpropane triacrylate | | | 20 | | 20 |
| acrylonitrile | 2.7 | | | | |

-continued

| | Parts by Weight | | | | |
|---|---|---|---|---|---|
| | I | II | III | IV | V |
| acrylamide | | 3.6 | | | |

To form the adduct the materials are combined in a carbon dioxide free atmosphere at a temperature of about 25 degrees C. In a period of about 2 hours the adduct formation is complete. * I, II, and III above are next repeated using the tetram disclosed at page 8 of the specification where the fatty tail is derived from tallow and the nitrile used to prepare the tetram is acrylonitrile.

EXAMPLE II

A liquid epoxy resin is prepared for use with adduct as follows:

| | E | F | G | H | J | K |
|---|---|---|---|---|---|---|
| Liquid Epoxy Resin (Epoxide Equivalent 182–190, viscosity 110–140 poise at 25° C.) | 90 | 90 | — | — | 85 | 100 |
| Liquid Epoxy Resin (Epoxide Equivalent 180–189, viscosity 70–100 poise at 25° C.) | — | — | 90 | 90 | — | — |
| 1,6-Hexanediol Diacrylate | 10 | — | — | — | — | — |
| trimethyol propane triacrylate | — | 10 | — | — | 15 | 10 |
| pentaerthritol triacrylate | — | — | 10 | — | — | — |

The foregoing is accomplished by mixing the epoxy resin and the acrylic component together. The following Table I shows the properties of the epoxy cured adducts.

TABLE I

| Component | Component | Weight Ratio L/M | Solvent* | % NV | Gard. Holdt Visc. | Pot Life (hrs | Tack Free Time (hrs | Sward Hardness | GE Impact | Water Res.** |
|---|---|---|---|---|---|---|---|---|---|---|
| I | E | 1/1 | 1 | 80 | D | >24 | <24 | 21 | >60% | SS |
| III | F | 1/1 | 1 | 80 | N | 6 | <24 | 10 | >60% | SS |
| III | J | 1/1 | 1 | 80 | O | 6 | <24 | 10 | 40–60% | SS |
| I | J | 1/1 | 1 | 80 | E | 5–6 | <24 | 22 | >60% | SS |
| I | J | 1/1.2 | 1 | 80 | E | 4–5 | <24 | 26 | >60% | SS |
| I | F | 1/1 | 1 | 80 | D | <24 | <24 | 31 | >60% | SS |
| I | F | 1/1.2 | 1 | 80 | D | <24 | <24 | 45 | >60% | SS |
| I | F | 1/1 | 2 | 80 | C | <24 | <24 | 22 | >60% | SS |
| I | F | 1/1.2 | 2 | 80 | C | <24 | <24 | 36 | >60% | SS |
| I | G | 1/1 | 1 | 80 | D | 7–8 | 24 | 30 | >60% | SS |
| I | G | 1/1.2 | 1 | 80 | E | 7–8 | 24 | 33 | >60% | SS |
| II | E | 1/1 | 1 | 80 | D | <24 | <24 | 23 | >60% | SS |
| I | H | 1/1.2 | 1 | 80 | D | <24 | <24 | — | 10–20% | OK |
| I | H | 1/1 | 1 | 80 | E | <24 | <24 | — | 10–20% | OK |

Hardness, impact and water resistance checked after 7-day cure at room temperature.
*Solvent 1 = 50/50 mixture isopropanol and ethylene glycol ethyl ether
Solvent 2 = 30% methyl n-butyl ketone, 30% ethylene glycol ethyl ether, 20% n-butanol, 20% hydrocarbon fraction BC-100
**Droplet of water on film overnight - droplet covered to prevent evaporation - no blistering with any samples. SS = slightly softened on scratching with fingernail.

What is claimed is:

1. An epoxy curable resin composition comprising an adduct of:
   (a) at least about three equivalents of a polyamine resin substantially free of polyamide groups containing at least two primary amine groups, and one secondary or tertiary amine group said polyamine resin having a fatty tail, and;
   (b) one equivalent per three equivalents of component (a) of a polyfunctional acrylic compound which is an ester of a member selected from the group consisting of acrylic acid and methacrylic acid and mixtures thereof and at least an equivalent amount of a polyol.

2. The composition of claim 1 wherein from about 3 to about 5 equivalents of the polyamine resin are utilized per equivalent of the polyfunctional acrylic compound.

3. The composition of claim 1 wherein the fatty tail on the polyamine resin contains from about 12 to about 24 carbon atoms.

4. The composition of claim 1 wherein the polyol portion of the polyfunctional acrylic compound contains at least 4 carbon atoms.

5. The composition of claim 1 wherein the polyol portion of the polyfunctional acrylic compound is free of reactive vinyl groups.

6. The composition of claim 1 wherein the polyamine resin is free of reactive vinyl groups.

7. The composition of claim 1 wherein the polyol portion of the polyfunctional acrylic compound is a diol.

8. The composition of claim 1 wherein the polyol portion of the polyfunctional acrylic compound is a triol.

9. The composition of claim 1 wherein the polyfunctional acrylic compound is based upon acrylic acid.

10. The composition of claim 1 wherein the polyfunctional acrylic compound is based upon methacrylic acid.

11. The composition of claim 4 wherein the polyol contains from about 4 to about 18 carbon atoms.

12. The composition of claim 3 wherein the fatty tail contains from about 14 to about 20 carbon atoms.

13. The composition of claim 1 containing acrylonitrile.

14. The composition of claim 1 containing acrylamide.

15. The composition of claim 1 wherein the polyamine resin is a fatty aminodipropylamine of the formula:

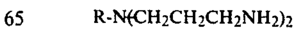

wherein R is the fatty tail.

16. The composition of claim 1 wherein the polyamine resin has a structural formula as shown below:

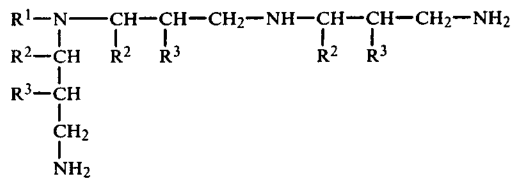

wherein $R_1$ is a fatty tail and $R^2$ and $R^3$ are selected from the group consisting of hydrogen and methyl and mixtures thereof.

17. A curable composition of an epoxy resin having 1,2-epoxide groups and an epoxy curable resin composition comprising an adduct of:

(a) at least about three equivalents of a polyamine resin substantially free of polyamide groups containing at least two primary amine groups, and one secondary or tertiary amine group said polyamine resin having a fatty tail, and;

(b) one equivalent per three equivalents of component (a) of a polyfunctional acrylic compound which is an ester of a member selected from the group consisting of acrylic acid and methacrylic acid and mixtures thereof and at least an equivalent amount of a polyol.

18. A cured composition formed from the reaction product of an epoxy resin having a 1,2-epoxide functionality and an epoxy curable resin composition comprising an adduct of:

(a) at least about three equivalents of a polyamine resin substantially free of polyamide groups containing at least two primary amine groups, and one secondary or tertiary amine group said polyamine having a fatty tail, and;

(b) one equivalent per three equivalents of component (a) of a polyfunctional acrylic compound which is an ester of a member selected from the group consisting of acrylic acid and methacrylic acid and mixtures thereof and at least an equivalent amount of a polyol.

* * * * *